United States Patent [19]

Lestradet

[11] 4,274,585
[45] Jun. 23, 1981

[54] CONTROL APPARATUS FOR AGRICULTURAL SPRAYERS HAVING A MIXING CHAMBER

[76] Inventor: Maurice C. J. Lestradet, 291 rue de Marechal de Lattre de Tassigny, 51230 Fere Champeneise, France

[21] Appl. No.: 35,854

[22] Filed: May 4, 1979

[30] Foreign Application Priority Data

Jun. 1, 1978 [FR] France .................................. 78 16420

[51] Int. Cl.³ .............................................. B05B 9/00
[52] U.S. Cl. ..................................... 239/124; 222/614; 222/624; 239/157; 239/170
[58] Field of Search ................ 222/608, 613, 614, 615, 222/616, 617, 623, 624, 626; 239/61, 124, 146, 155, 156, 157, 158, 170, 172, 304

[56] References Cited

U.S. PATENT DOCUMENTS

| | | | |
|---|---|---|---|
| 2,757,044 | 7/1956 | Gerbracht | 239/157 X |
| 2,774,626 | 12/1956 | Gerbracht | 239/157 |
| 3,301,487 | 1/1967 | Young | 239/155 X |
| 3,339,843 | 9/1967 | Horton | 239/157 |
| 3,481,540 | 12/1969 | Maytum et al. | 239/155 X |
| 3,587,971 | 6/1971 | Ross | 239/155 |
| 4,005,803 | 2/1977 | Kent | 222/614 X |
| 4,083,494 | 4/1978 | Ballu | 239/156 |

FOREIGN PATENT DOCUMENTS 916025  1/1963  United Kingdom ..................... 239/155

Primary Examiner—Stanley H. Tollberg
Assistant Examiner—Edward M. Wacyra
Attorney, Agent, or Firm—Richard H. Zaitlen

[57] ABSTRACT

The apparatus comprises a main reservoir for water and at least one secondary reservoir for an additive material. Both reservoirs are connected to a mixing chamber which is connected to independent segments of a spray distribution bank via separate pipes. A pump pumps the additive material to the mixing chamber. A driving mechanism responsive to the speed of the vehicle drives the pump as a function of the speed of the vehicle and thereby effects a first regulation of the flow of additive material to the mixing chamber. A valve is interposed between the secondary reservoir and the mixing chamber for effecting a second regulation of the flow of additive material to the mixing chamber as a function of the number of segments of the spray distribution bank in use.

7 Claims, 1 Drawing Figure

U.S. Patent  Jun. 23, 1981  4,274,585
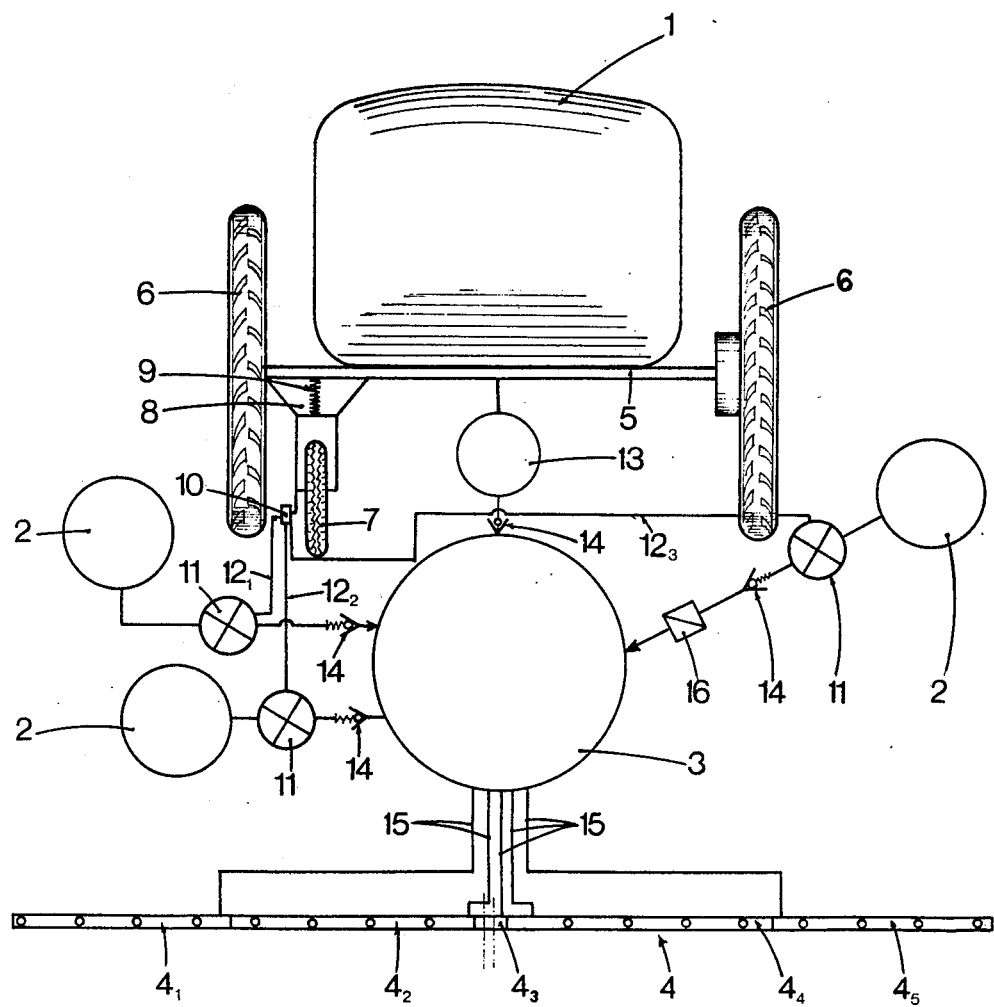

CONTROL APPARATUS FOR AGRICULTURAL SPRAYERS HAVING A MIXING CHAMBER

BACKGROUND OF THE INVENTION

1. Field of the Invention

The invention relates to spray mixing apparatuses, and specifically for an apparatus which regulates the proportion of elements in a spray solution based upon vehicle speed and upon the number of operating segments of the spray distribution bank.

2. Prior Art

Agricultural sprayers generally consist of a movable frame on which a reservoir is located. The reservoir usually contains a large quantity of water, e.g., 4,000 liters, and additional chemicals such as nitrated dyes, used as selective weed killers, or diluted minor elements, e.g., sulfur or magnese. This pre-mixed solution is contained within the single reservoir.

The reservoir is usually equipped with a heavy duty pump, which is able to remove the pre-mixed solution from the reservoir and eject it under pressure into a spray distribution bank located on the frame. The distribution bank may consist of several independent segments, each having their own spray nozzles. As was revealed in French Patent Application No. 7,412,009 of Apr. 4, 1974 and French Patent Application No. 7,626,203, of Aug. 31, 1976, both to the present inventor, the flow of solution from the distribution bank may be regulated in accordance with the speed of the tractor to which the sprayer is attached.

Such an apparatus has a significant disadvantage in that the solution of water and additional products are pre-mixed in the storage reservoir thereby preventing the proportion of elements from being changed as the solution is being distributed. Unfortunately, it is desirable to be able to modify the proportions of the spray solution when a variety of types of crops are being sprayed, or when there is a change in the number of segments which are operating, especially when a segment of the distribution bank is turned off during the spraying operation.

In such cases, the proportion of elements in the solution must be adjusted to prevent the crops from being "burned" when the vehicle slows down, or to prevent an uneven spray pattern due to changes in velocity of the sprayer. Such speed changes are impossible to avoid due to the nature of agricultural terrain.

It is an object of the herein disclosed invention to provide a spray mixing apparatus which controls the proportions of the solution being sprayed according to the speed of the distribution vehicle and the number of operating sections of the spray distribution bank, thereby eliminating the disadvantages of sprayers not so equipped.

SUMMARY OF THE INVENTION

These and other objectives are achieved by the herein disclosed invention which provides an apparatus for automatically regulating the proportion of elements making up a solution to be distributed. The proportion of elements is regulated on the basis of (1) changes in speed of the spray distribution vehicle, and (2) the number of segments of the sprayer's distribution bank in use at any moment. The invention comprises at least two reservoirs, a main reservoir and a secondary reservoir, feeding into a mixing chamber which connects to a spray distribution bank. The secondary reservoir is connected to a flow control device which is operated via a drive mechanism which is itself controlled by the speed of the vehicle. The flow control device controls the amount of solution in the secondary reservoir which is mixed with the contents of the first reservoir.

In one embodiment of the invention, the control device is a proportioning pump.

In an embodiment of the invention, the drive mechanism connects to a wheel of the spray vehicle in such a way that the drive mechanism can control the flow from the variable flow device in proportion to the speed of the wheel.

In another embodiment of the invention, several secondary reservoirs are provided, each equipped with a proportioning pump connected to one of the drive wheels by a drive mechanism.

BRIEF DESCRIPTION OF THE DRAWINGS

The FIGURE is a diagrammatic representation of one embodiment of the invention.

DETAILED DESCRIPTION OF THE EMBODIMENT

The FIGURE illustrates one embodiment of an invention which provides for the varying of the proportions of elements to be mixed for use in an agricultural sprayer in accordance with the speed of the sprayer and the number of independent operating segments of a distribution bank 4. The sprayer has one or more secondary reservoirs 2, in addition to its main reservoir 1. Each of the reservoirs 1, 2 are connected to a mixing chamber 3, which is itself connected to the distribution bank 4. The distribution bank 4 is composed of several independent segments $4_1$, $4_2$, $4_3$, $4_4$, and $4_5$. The main reservoir 1 is attached to a movable frame 5 having one or more wheels 6. This frame 5 also has an auxiliary wheel 7, which in one embodiment may not be driven. This auxiliary wheel 7 is mounted on a secondary frame 8 which is attached to the frame 5 via a bias spring 9. The bias spring 9 insures that the auxiliary wheel 7 remains in contact with the ground as the sprayer is moved across the ground. A speed gauge 10 is connected to the auxiliary wheel 7. In one embodiment, the speed gauge 10 may be a tachometer generator.

Each of the secondary reservoirs 2 are equipped with a proportioning pump 11 which is connected to the speed gauge 10 via a drive mechanism $12_1$, $12_2$, ..., $12_3$, in such a way that the solutions flowing through these pumps 11 are proportional to the speed of the vehicle. Changes in speed of the sprayer cause a change in speed of rotation of the auxiliary wheel 7, thereby transmitting the speed changes to the drive mechanisms $12_1$, $12_2$, ... $12_3$, and to the proportioning pumps 11 whose rotational speed or piston stroke is then modified, causing the quantity of solution injected into the mixing chamber 3 to be varied.

In the embodiment illustrated in the FIGURE the sprayer includes a main reservoir 1 and three secondary reservoirs 2. The main reservoir 1 may have a large fluid capacity, e.g. 4,000 liters, and usually contains only water, the usual liquid to which additional products, stored in the secondary reservoirs, are added. The main reservoir 1 is equipped with a commercial pump 13, which injects water from the reservoir 1 into the mixing chamber 3 under pressure, e.g., 3 bars. The proportioning pumps 11 should have a higher pressure rating than that of the pump 13 to prevent water which was injected into the mixing chamber 3 from being driven back into the secondary reservoirs 2. In addition, check valves 14 are located between each proportioning pump 11 and the mixing chamber to prevent back flow. The secondary reservoirs 2 may contain additional elements and products such as nitrated dyes, e.g., selective weed killers, minor elements such as sulfur or maganese or plant hormones, which may themselves constitute selective weed killers.

One possible spray solution which has been successfully used mixes 12 kilograms of nitrated dye, 10 liters of plant hormones, and 0.5 liters of diluted minor elements into 400 liters of water.

The advantage of having secondary reservoirs 2 is that the water and active elements of the solution are separated until the actual time that the solution will be sprayed. This is desirable because certain solutions, when mixed, become neutralized after a short period of time. In addition, it is more practical to be able to easily move from one crop to the next without having to clean the main reservoir 1, a necessary step for mechanical sprayers using pre-mixed solutions. Since in the herein disclosed invention the additional elements are contained in secondary reservoirs 2, each such reservoir being provided with its own proportioning pump 11, it is possible to vary the quantity of solution injected from each reservoir into the mixing chamber 3 based on the speed changes of the sprayer.

Each drive mechanism $\mathbf{12}_1, \ldots, \mathbf{12}_3$, responsible for conveying the output of the speed gauge 10 attached to the auxiliary wheel 7 to its respective proportioning pump 11 may comprise a transmission belt, chain, beveled gears, rods, or even a variable speed electric motor connected to each proportioning pump 11. Such a motor would be used in conjunction with a tachometer generator as the speed gauge 10. Of course, the teachings of the invention encompass drive mechanisms other than those stated since any drive mechanism would come under the spirit and scope of the invention so long as each proportioning pump 11 could be individually controlled by a speed gauge 10 in accordance with the speed of the vehicle.

Secondary reservoirs 2 and proportioning pumps 11 also allow additional elements stored in the secondary reservoirs 2 to be mixed in the mixing chamber 3 as a function of the number of segments in use in distribution bank 4 at any given moment.

The mixing chamber 3, which receives water from the main reservoir 1 and additional elements from the secondary reservoirs 2, is connected to each of the distribution bank segments $\mathbf{4}_1, \mathbf{4}_2, \ldots, \mathbf{4}_5$, via flexible hoses 15. Each secondary reservoir 2 is provided with a control valve 16. In one embodiment, the control valve 16 comprises a 3-way valve which can be automatically controlled to return some or all of the element from a secondary reservoir 2 back to the secondary reservoir, or may send a portion to the mixing chamber 3. Such a control valve 16 allows additional elements to be mixed in the mixing chamber 3 when additional segments of the distribution bank 4 are in use. In particular, if we assume that the spray distribution bank 4 contains five segments, and that the spraying apparatus includes five secondary reservoirs 2, whenever one of the secondary reservoirs 2 may be turned off, maintaining the proper proportion of elements in the mixed solution, thereby preventing an overdosage.

Use of a 3-way valve 16 is only one embodiment of the teachings of the invention since it is also possible that additional secondary reservoirs 2 would contain different elements. In addition, each proportioning pump 11 could possibly be connected to a computer, which could appropriately control each of the proportioning pumps 11 depending upon the number of segments of the distribution bank in use. Such a device was disclosed in French Patent Application No. 7,626,203 of Aug. 31, 1976 by the present inventor.

Only a limited number of embodiments of the disclosed invention have been discussed herein, but it will be readily apparent to persons skilled in the art that certain changes and modifications may be made without departing from the spirit of the invention. Accordingly, the foregoing disclosure, description, and FIGURE are for illustrative purposes only and do not in any way limit the invention, which is defined only by the claims.

What is claimed is:

1. An apparatus for automatically regulating the application of a spray solution on the basis of speed changes of a sprayer vehicle, and on the basis of the number of operating segments of a distribution bank carried by said sprayer vehicle for applying said spray solution, comprising:

a main reservoir for storage of a primary component of said spray solution;

a mixing chamber joined to said main reservoir by a connecting pipe;

a secondary reservoir for storage of a possible additional component of said spray solution, said secondary reservoir being connected to said mixing chamber by a connecting pipe;

volume means responsive to the speed of the vehicle for effecting a first regulation of the flow of fluid from said secondary reservoir to said mixing chamber through said connecting pipe between said secondary reservoir and said mixing chamber as a function of the speed of said vehicle;

a distribution bank comprising a given plural number of independent segments;

connecting pipes respectively putting said segments in communication with said mixing chamber, and means for effecting a second regulation of flow of fluid from said secondary reservoir to said mixing chamber, said second regulation being superimposed on said first regulation in said connecting pipe between said secondary reservoir and said mixing chamber for the purpose of regulating the flow of fluid from said secondary reservoir to said mixng chamber also as a function of the member of said segments in use;

the size of said mixing chamber being considerably larger than the sectional size of said connecting pipes.

2. An apparatus according to claim 1, wherein said volume means comprises a proportioning pump.

3. An apparatus according to claim 2, including a drive mechanism for providing a link between said proportioning pump and a wheel of said vehicle to vary the flow from said pump in proportion to the speed of said wheel.

4. An apparatus according to claim 2 including a plurality of secondary reservoirs connected to said mixing chamber, each secondary reservoir being equipped with a proportioning pump connected to a wheel of said vehicle by a drive mechanism.

5. An apparatus according to claim 4, wherein each secondary reservoir is provided for a respective segment of said distribution bank.

6. An apparatus according to claim 4, wherein the proportioning pump of each secondary reservoir is associated with a valve for recycling at least a part of the associated additional component back into the respective secondary reservoir and thereby effecting said second regulation.

7. An apparatus according to claim 6, wherein said vehicle has a driver's seat, and means are provided for controlling said valves from said driver's seat to turn off some of said proportioning pumps in accordance with the number of operating sections of said distribution bank.

* * * * *